Patented Oct. 5, 1954

2,691,032

UNITED STATES PATENT OFFICE 2,691,032

ESTER END BLOCKED POLYSILOXANES

Leo Harry Sommer, State College, Pa., assignor to Dow Corning Corporation, Midland, Mich., a corporation of Michigan No Drawing. Application May 24, 1951,
Serial No. 228,121

4 Claims. (Cl. 260—448.2)

This invention relates to ester end blocked polysiloxanes. It is the object of this invention to prepare triorganosilyl end blocked organopolysiloxane polymers in which one of the end blocking groups is an ester. The utility of these materials lies in the fact that with a reactive group on the ends of the chains the polymers can be further condensed by reacting the ester group with reagents which normally react with organic esters. This offers a new way of preparing siloxane resins.

This invention relates to compounds of the formula $RO_2CCH_2CH_2Si(CH_3)_2O[(CH_3)_2SiO]_nSi(CH_3)_2CH_2CH_2CO_2R$ where R is an alkyl radical and $n$ has a value of at least one. The above materials may be prepared by copolymerizing cyclicdimethylsiloxanes such as octamethylcyclotetrasiloxane with a disiloxane of the formula $[RO_2CCH_2CH_2(CH_3)_2SI]_2O$ The copolymerization may be carried out in a normal manner for copolymerizing triorgano- and diorganosiloxanes. Preferably the catalyst employed is an acid.

The above ester disiloxanes may be prepared by esterifying the corresponding dicarboxylic-disiloxanes with an alcohol of the formula ROH. For this purpose any alcohol in which R is alkyl may be employed and is included within this invention. For example, methyl, ethyl, octyl and stearyl alcohols are operative. The disiloxane-dicarboxylic acids above shown are described and claimed in the applicant's copending application Serial Number 155,784, filed April 13, 1950, now Patent 2,589,446.

The following examples are illustrative only and are not to be construed as limiting the invention.

Example 1

375.6 grams of the acid $HOOCCH_2CH_2Si(CH_3)_2OSi(CH_3)_2CH_2CH_2COOH$ 2 liters of absolute ethyl alcohol and 25 ml. of concentrated HCl were refluxed for 18 hours. At the end of this time, the water-ethanol azeotrope was distilled. The remaining ethanol was removed and the product was vacuum distilled. There was obtained 407 grams of the ethylester boiling 153° C. at 5 mm. having a density at 20° C. of 1.4340. This represented a 90 per cent yield of the ester whose formula is $C_2H_5OOCCH_2CH_2Si(CH_3)_2OSi(CH_3)_2CH_2CH_2COOC_2H_5$ 104.5 grams of this ester, 23.9 grams of octamethylcyclotetrasiloxane and 3 ml. of sulfuric acid were mixed and stirred at room temperature for 14 hours. 8 ml. of water were added and stirring was continued for an additional hour. The organic layer was separated, was washed once with 5 per cent sodium bicarbonate solution and once with water. The organic layer was dried over anhydrous sodiumsulfate. 30 ml. of benzene were added to the partially dried material and the water-benzene azeotrope was distilled. The residue was distilled under vacuum and the following compounds were isolated:

$C_2H_5O_2CCH_2CH_2(CH_3)_2SiO(CH_3)_2SiOSi(CH_3)_2CH_2CH_2CO_2C_2H_5$ boiling point 174° C. at 7 mm., $n_D^{20}$ 1.4283, $D_4^{20}$ .9787 and molar refraction 107.67;

$C_2H_5O_2CCH_2CH_2(CH_3)_2SiO[(CH_3)_2SiO]_2Si(CH_3)_2CH_2CH_2CO_2C_2H_5$ boiling point 186° C. at 7 mm., $n_D^{20}$ 1.4257, $D_4^{20}$ .9796 molar refraction 126.29; and $C_2H_5O_2CCH_2CH_2(CH_3)_2SiO[(CH_3)_2SiO]_3Si(CH_3)_2CH_2CH_2CO_2C_2H_5$ boiling point 190° C. at 4 mm., $n_D^{20}$ 1.4245, saponification equivalent 277. There remained a residue which was composed of a mixture of higher polymers having more than 3 dimethylsiloxane units in the chain.

That which is claimed is:

1. $RO_2CCH_2CH_2(CH_3)_2SiO[(CH_3)_2SiO]_nSi(CH_3)_2CH_2CH_2CO_2R$ where R is an alkyl radical and $n$ has a value of at least 1.

2. A compound in accordance with claim 1 where R is ethyl and $n$ is 1.

3. A compound in accordance with claim 1 where R is ethyl and $n$ is 2.

4. A compound in accordance with claim 1 where R is ethyl and $n$ is 3.

References Cited in the file of this patent

UNITED STATES PATENTS

| Number | Name | Date |
|---|---|---|
| 2,550,205 | Speier | Apr. 24, 1951 |
| 2,570,090 | Barry et al. | Oct. 2, 1951 |
| 2,589,446 | Sommer | Mar. 18, 1952 |

OTHER REFERENCES

Gold et al.: J. A. C. S., vol. 71, page 2874 (1948).
Lommer et al.: Ibid., vol. 71, page 1509 (1949).
Sommer et al.: "Jour. Am. Chem. Soc.," vol. 73, February 1951, page 882.